United States Patent
Berger et al.

(10) Patent No.: US 7,634,284 B2
(45) Date of Patent: Dec. 15, 2009

(54) METHOD AND APPARATUS FOR REDUCING DATA RATE TRANSMITTED IN A BEAM WITHOUT AFFECTING ITS POWER FLUX DENSITY

(75) Inventors: Harvey L. Berger, Redondo Beach, CA (US); Stuart T. Linsky, Rancho Palos Verdes, CA (US)

(73) Assignee: Northrop Grumman Corporation, Los Angeles, CA (US)

(*) Notice: Subject to any disclaimer, the term of this patent is extended or adjusted under 35 U.S.C. 154(b) by 1063 days.

(21) Appl. No.: 10/733,506

(22) Filed: Dec. 11, 2003

(65) Prior Publication Data

US 2005/0130599 A1 Jun. 16, 2005

(51) Int. Cl.
*H04B 15/00* (2006.01)
(52) U.S. Cl. .................................................. 455/505
(58) Field of Classification Search ............... 455/505
See application file for complete search history.

(56) References Cited

U.S. PATENT DOCUMENTS 5,325,394 A * 6/1994 Bruckert .................... 375/148
5,838,733 A * 11/1998 Bruckert .................... 375/297
5,930,680 A    7/1999 Lusignan et al.

OTHER PUBLICATIONS

Tomlinson et al ["Fade Countermeasures at Ka Band: Direct Inter-establishment Communications Experiment (DICE)", IEE Colloquium on Dec. 17, 1991, pp. 4/1-4/6].*

Tomlinson M. et al. "Fade Countermeasures at Ka Band: Direct Inter-Establishment Communications Experiment (DICE)", IEEE, 1991, pp. 4/1-4/6.

* cited by examiner

*Primary Examiner*—Alexander Jamal
(74) *Attorney, Agent, or Firm*—Carmen Patti Law Group, LLC

(57) ABSTRACT

A technique for enhancing the signal-to-noise performance of a digital communication link without affecting its power flux density. An information data stream has its original signaling rate selectively reduced prior to transmission, to enhance signal-to-noise performance. Then the reduced signaling rate information signal is combined with a pseudorandom data sequence at the original signaling rate, to provide a randomized data sequence to be transmitted at the original signaling rate, thereby maintaining power flux density levels below those permitted by regulatory limits.

18 Claims, 1 Drawing Sheet

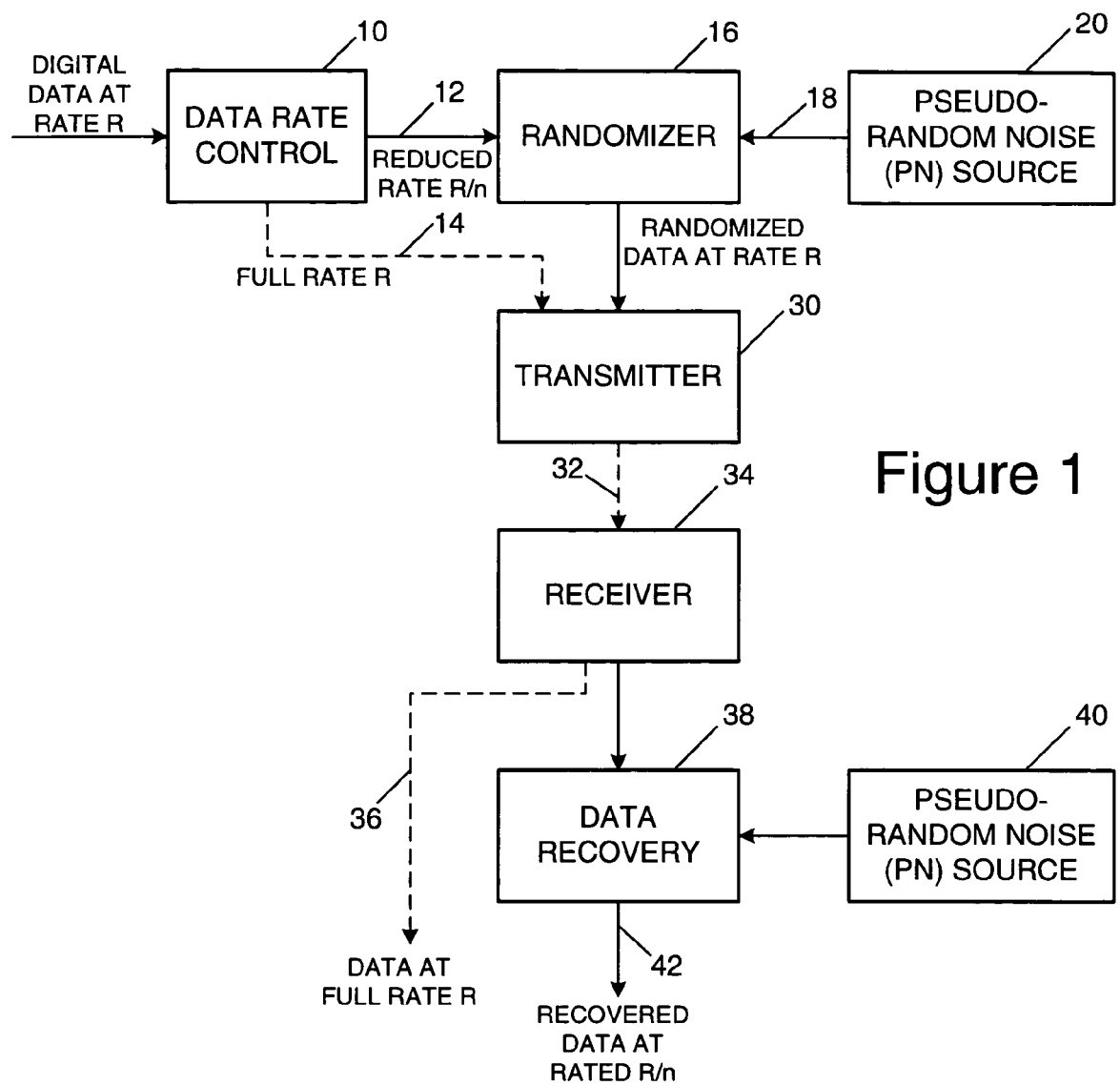
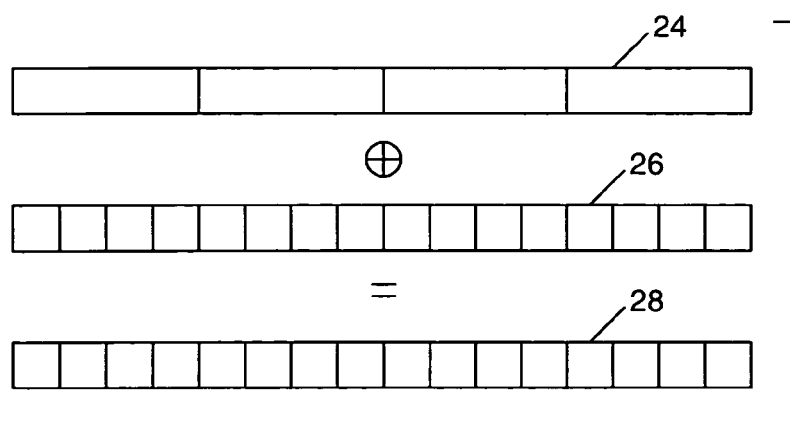

METHOD AND APPARATUS FOR REDUCING DATA RATE TRANSMITTED IN A BEAM WITHOUT AFFECTING ITS POWER FLUX DENSITY

BACKGROUND OF THE INVENTION

The present invention relates generally to digital communication systems and, more particularly, to satellite communication systems in which information is transmitted from one point to another on or near the earth's surface, by way of one or more satellite-based space stations. The power flux density (PFD) of each uplink beam to a satellite and of each downlink beam from a satellite is limited to a prescribed maximum value by governmental regulation, specifically by the Federal Communications Commission (FCC) in the United States and by international and other agencies in other countries. The power flux density is defined as the measured power, in watts per square meter per hertz of spectral bandwidth. A related measure of radiated power density is the power spectral density (PSD), which is defined as the measured power per hertz of bandwidth.

For most efficient operation, most communication systems operate at at or close to the maximum PFD limit. When operating in this condition, the system signal-to-noise ratio (SNR) cannot be increased either by decreasing the signaling rate or increasing the total transmitted power without exceeding the PFD limit.

There is sometimes a need to compensate for attenuation by rain on the path from the satellite to the ground receiver. If the rain attenuation is uniform over the entire beam, the decreased SNR can be mitigated by reducing the signaling rate in proportion to the increase in attenuation, and the PFD at the surface of the earth will not exceed the PFD limit. If, however, the rain is localized so it affects only a portion of the beam, compensating for rain attenuation by decreasing the signaling rate will result in the PFD limit being exceeded in those regions unaffected by rain.

It will be appreciated from the foregoing that there is need for a technique that will allow reducing the data rate to compensate for rain attenuation without affecting the power flux density of the beam. The present invention is directed to this end.

SUMMARY OF THE INVENTION

The present invention is concerned with a technique for reducing the signaling rate of a communication channel without a corresponding increase in the power flux density. In brief, the method of the invention comprises selecting a reduced signaling rate that is a fraction of an original signaling rate R; randomizing the reduced signaling rate signal to produce a signal at the original signaling rate R; and transmitting the randomized signal. The reduced signaling rate results in an enhanced signal-to-noise ratio per bit of information, and transmission at the full signaling rate ensures the power flux density will be unchanged.

In terms of digital communication apparatus, the invention may defined as comprising means for reducing the rate of an information data stream to be transmitted from an original signaling rate R to a selected reduced rate; a pseudorandom noise source generating a stream of practically random data at the original signaling rate R; means for logically combining the reduced signaling rate information data stream and the data stream from the pseudorandom noise generator; and means for transmitting the logically combined data stream at the original signaling rate. Signal-to-noise performance is thereby enhanced to compensate for rain attenuation without increasing the power flux density.

It will be appreciated from this brief summary that the invention provides a significant improvement over the prior art since enhanced signal-to-noise performance can be obtained by reducing the signaling rate, but without affecting the power flux density. Other aspects and advantages of the invention will become apparent from the following more detailed description, taken in conjunction with the accompanying drawings.

BRIEF DESCRIPTION OF THE DRAWINGS

FIG. 1 is a block diagram depicting the technique of the invention for reducing the signaling rate without affecting the power flux density of the corresponding transmitted signal.

FIG. 2 is a diagram showing the signal format for a signaling rate reduction by a ratio of 4:1 in accordance with the invention.

DETAILED DESCRIPTION OF THE INVENTION

As shown in the drawings for purposes of illustration, the present invention is concerned with a method, and corresponding apparatus, for reducing the information data rate transmitted through a communication channel, without affecting the power flux density of the transmitted signals. As discussed above, government regulations impose an upper limit on the power flux density (PFD) of radio-frequency signals, and these limits apply to transmission from space-to-Earth and from Earth-to-space. When there is a need to compensate for rain attenuation on satellite downlinks by decreasing the signaling rate, in general it will not be possible to do so without exceeding the PFD limit for some areas of the beam coverage. By way of further background, this problem is further discussed in the following paragraphs.

In digital communication systems, an important performance characteristic, signal-to-noise ratio (SNR) is typically represented by the ratio $E_b/N_0$, where $E_b$ is the energy per bit, or more specifically the total power of the transmitted signal divided by the bit rate, and $N_0$ is the noise power spectral density, or more specifically the noise power in each hertz of bandwidth. Thus the ratio $E_b/N_0$ can be expressed as $P_T/(N_0 \cdot R)$, where $P_T$ is the total power of the transmitted signal. If there is a need to increase the $E_b/N_0$ ratio, this may only be done either by increasing the transmitted signal power or reducing the data rate R. The noise density $N_0$ is substantially constant, and the total power $P_T$ cannot be increased without increasing the power flux density. Although reducing the data rate R will increase the $E_b/N_0$ ratio, the power flux density (PFD) will also be correspondingly increased because reducing the signaling rate decreases the occupied bandwidth, and the PFD is measured on a power-per-bandwidth basis; hence reducing the data rate increases the PFD.

A practical example of the need for increasing the SNR (or $E_b/N_0$) ratio occurs when there is rain between a satellite transmitter and the ground. The rain will attenuate the downlink signal and decrease the received SNR. By way of example, suppose the rain attenuation were 10 dB (decibels). Without some change in the operation of the transmitter, this attenuation would significantly increase the bit error rates at the ground-based receiver. Ideally, it would be desirable to increase the SNR by either increasing the transmitter power or decreasing the signaling rate in proportion to the rain attenuation. Unfortunately, the diameter of the transmitted beam is typically significantly larger than a rain cell. For those locations on the ground for which the beam is attenuated by rain, the PFD will remain essentially unchanged; however, for those areas on the ground not experiencing rain attenuation on the path between the satellite and the receiver, the PFD will increase by 10 dB and violate the regulatory limit on PFD.

In accordance with the present invention, the information data rate is decreased without any corresponding increase in the PFD. As shown in FIG. 1, digital data at its maximum rate (R) bits per second is subject to data rate control as indicated in box 10, which reduces the information data rate, optionally, to a selected fraction, 1/n, of the full data rate R. Reduction of the data rate can be achieved by any desired means, such as using data buffers to store the data and then read a data stream out from the buffers at the desired lower rate, on line 12. It will be understood that the data rate control 10 may also be operated to provide output on line 14 at the full data rate. The reduced rate data stream on line 12 is input to a randomizer 16, which also receives as input, over line 18, a randomly varying stream of bits at the full data rate. By way of example, the stream of bits on line 18 may be generated by a pseudo-random noise, or pseudo-noise (PN), source 20. As is well known, a pseudorandom sequence is a sequence of bits generated using a mathematical algorithm, such that the elements of the sequence are practically independent and, for most purposes, the sequence may be considered to be random.

By way of example, the randomizer 16 may be simply an exclusive OR (XOR) gate whereby successive elements of the rate-R PN sequence are logically combined with the information data bits on line 12. FIG. 2 shows this process diagrammatically. The information data stream at a rate of R/4 is shown at 24 and the PN code sequence at rate R is shown at 26. The result of the randomizing step is an encoded sequence 28 at the full rate R, containing information data at the reduced R/4 rate. The latter data sequence is input to a transmitter 30, where the sequence is used to modulate a carrier in a conventional manner, such as by binary phase shift keying (BPSK) or quadrature phase shift keying (QPSK). The resulting signal is transmitted as indicated by the broken line 32 to a receiver 34. If the original input data stream was transmitted at the full rate R, the receiver 34 will generate output signals at the full data rate on line 36. When the data sequence is transmitted at the reduced information data rate R/4, additional data recovery processing is required, as indicated in block 38. In this step of data recovery, a local PN source 40 is used to recover the original R/4 rate data stream from the received signals, as indicated on output line 42. It will be readily understood that the local PN source 40 must be synchronized with the PN source 20 at the transmitter end of the communication channel. Also omitted from the illustration are conventional means for demodulating the received signals, including means for generating a local carrier signal at the receiving end, and means for synchronizing the local carrier signal with the received signals.

The effect of transmitting at the reduced information data rate, such as R/4, is that the ratio $E_b/N_0$ is increased by a factor of four because reduction in the information data rate increases the energy per bit, $E_b$. However, the power flux density is unchanged because the randomized bit stream is still being transmitted at the full signaling rate. Randomizing the data stream has the effect of spreading the signal power over a broad spectrum. Data recovery at the receiver includes despreading the signal to recover the reduced data rate information signal.

It will be appreciated from the foregoing that the present invention represents a significant advance in the field of digital communication systems. In particular, the invention provides a technique for reducing the information data rate, and therefore increasing the signal-to-noise ratio associated with a transmitted beam, without affecting the power flux density of the beam. It will also be appreciated that, although a specific embodiment of the invention has been illustrated and described by way of example, various modifications may be made without departing from the spirit and scope of the invention. Accordingly, the invention should not be limited except as by the appended claims.

The invention claimed is:

1. A method for enhancing signal-to-noise ratio associated with a transmitted digital communication signal without affecting its power flux density, the method comprising the following steps performed in a transmitter:
    selecting a reduced information data rate that is a fraction of a full data rate R, wherein the reduced information data rate is ¼ of the full data rate R;
    randomizing the reduced data rate information signals to produce an encoded data stream at the full data rate R; and
    transmitting the encoded data stream;
    wherein the reduced information data rate results in an enhanced signal- to-noise ratio, per bit of information, that is increased by a factor of four due to reduction in the information data rate increasing the energy per bit, and wherein transmittal of the encoded data stream at the full data rate ensures that power flux density will not be significantly changed;
    wherein the information data rate is decreased without any corresponding increase in the power flux density, the information data rate being reduced to a selected fraction, ¼, of the full data rate R resulting in an encoded sequence at the full rate R, containing information data at the reduced R/4 rate; and
    wherein the effect of transmitting at the reduced information data rate, R/4, is that the signal to noise ratio is increased by a factor of four because reduction in the information data rate increases the energy per bit without change in power flux density because the randomized combined data stream is still being transmitted at the full data rate.

2. The method of claim 1, further comprising the following steps performed in a receiver:
    receiving and demodulating the transmitted encoded data stream; and
    recovering data at the reduced information data rate.

3. The method of claim 1, wherein the randomizing step comprises:
    generating a pseudorandom noise sequence of bits at the full data rate R; and
    logically combining the pseudorandom noise sequence with the reduced information data rate signals to produce the encoded data stream.

4. The method of claim 3, wherein the logically combining step further comprises the step of performing a logical exclusive OR operation.

5. The method of claim 3, further comprising The following steps performed in a receiver:
    generating a pseudorandom noise sequence; and
    logically combining the pseudorandom noise sequence generated in the receiver with the received data signals, to recover the signals transmitted at the reduced data rate.

6. A digital communication apparatus, comprising:
    means for reducing the rate of an information data stream to be transmitted from a full rate R to a selected reduced rate, wherein theselected reduced rate is ¼ of the full data rate R;
    a pseudorandom noise source generating a stream of practically random data at the full data rate R;
    means for logically combining the reduced rate information data stream and the data stream from the pseudorandom noise generator; and
    means for transmitting the logically combined data stream;
    wherein signal-to-noise performance of the transmitter is enhanced without increasing power flux density levels;

wherein the reduced information data rate results in an enhanced signal-to-noise ratio, per bit of information, that is increased by a factor of four due to reduction in the information data rate increasing the energy per bit;

wherein the information data rate is decreased without any corresponding increase in the power flux density, the information data rate being reduced to a selected fraction, ¼, of the full data rate R resulting in an encoded sequence at the full rate R, containing information data at the reduced R/4 rate; and wherein the effect of transmitting at the reduced information data rate, R/4, is that the signal to noise ratio is increased by a factor of four because reduction in the information data rate increases the energy per bit without change in power flux density because the randomized combined data stream is still being transmitted at the full data rate.

7. The digital communication apparatus of claim 6, wherein:
the means for logically combining comprises a logical exclusive OR circuit.

8. The digital communication apparatus of claim 6, further comprising:
means for receiving and demodulating the logically combined data stream;
a second pseudorandom noise source located near the means for receiving, for generating a stream of data identical with the one produced by the first pseudorandom noise source; and
means for logically combining the demodulated data stream with the data stream from the second pseudorandom noise source, for recovering the original data stream at the reduced data rate.

9. The digital communication apparatus of claim 6, wherein the means for reducing the rate of the information data stream comprises data buffers used to store the information data stream.

10. The digital communication apparatus of claim 6, wherein, upon input to the means for transmitting, the logically combined data stream is used to modulate a carrier via binary phase shift keying (BPSK).

11. A system, comprising:
a data rate control device operable to reduce the rate of an information data stream to be transmitted from a full rate R to ¼ of the full data rate R;
a pseudorandom noise source operable to generate a stream of practically random data at the full data rate R;
a first logical exclusive OR circuit operable to combine the reduced rate information data stream and the data stream from the pseudorandom noise generator;
a transmitter operable to send the logically combined data stream;
a receiver operable to demodulate the logically combined data stream;
a second pseudorandom noise source located near the receiver, operable to generate a stream of data identical with the one produced by the first pseudorandom noise source; and
a second logical exclusive OR circuit operable to combine the demodulated data stream with the data stream from the second pseudorandorn noise source, to recover the original data stream at the reduced data rate;
wherein the reduced information data rate results in an enhanced signal-to-noise ratio, per bit of information, that is increased by a factor of four due to reduction in the information data rate increasing the energy per bit, and wherein transmittal of the encoded data stream at the full data rate ensures that power flux density will not be significantly changed;

wherein the information data rate is decreased without any corresponding increase in the power flux density, the information data rate being reduced to a selected fraction, ¼, of the full data rate R resulting in an encoded sequence at the full rate R, containing information data at the reduced R/4 rate; and wherein the effect of transmitting at the reduced information data rate, R/4, is that the signal to noise ratio is increased by a factor of four because reduction in the information data rate increases the energy per bit without a change in power flux density because the randomized combined data stream is still being transmitted at the full data rate.

12. The system of claim 11, wherein data rate control device comprises data buffers operable to store the information data stream.

13. The system of claim 11, wherein, upon input to the transmitter, the logically combined data stream is used to modulate a carrier via binary phase shift keying (BPSK).

14. A digital communication apparatus, comprising:
means for reducing the rate of an information data stream to be transmitted from a full rate R to a predetermined reduced rate, wherein the predetermined reduced rate is 1/n of the full data rate R;
a pseudorandom noise source generating a stream of practically random data at the full data rate R;
means for logically combining the reduced rate information data stream and the data stream from the pseudorandom noise generator; and
means for transmitting the logically combined data stream;
wherein signal-to-noise performance of the transmitter is enhanced without increasing power flux density levels;
wherein the reduced information data rate results in an enhanced signal-to-noise ratio, per bit of information, that is increased by a factor of n due to reduction in the information data rate increasing the energy per bit;
wherein the information data rate is decreased without any corresponding increase in the power flux density, the information data rate being reduced to a predetermined fraction, 1n, of the full data rate R resulting in an encoded sequence at the full rate R, containing information data at the reduced R/n rate; and
wherein the effect of transmitting at the reduced information data rate, R/n, is that the signal to noise ratio is increased by a factor of four because reduction in the information data rate increases the energy per bit without change in power flux density because the randomized combined data stream is still being transmitted at the full data rate.

15. The digital communication apparatus of claim 14, wherein:
the means for logically combining comprises a logical exclusive OR circuit.

16. The digital communication apparatus of claim 14, further comprising:
means for receiving and demodulating the logically combined data stream;
a second pseuciorandom noise source located near the means for receiving, for generating a stream of data identical with the one produced by the first pseudorandom noise source; and
means for logically combining the demodulated data stream with the data stream from the second pseudorandom noise source, for recovering the original data stream at the reduced data rate.

17. The digital communication apparatus of claim 14, wherein the means for reducing the rate of the information data stream comprises data buffers used to store the information data stream.

18. The digital communication apparatus of claim 14, wherein, upon input to the means for transmitting, the logically combined data stream is used to modulate a carrier via binary phase shift keying (BPSK).

* * * * *